US012594807B2

(12) United States Patent
Bouaru et al.

(10) Patent No.: US 12,594,807 B2
(45) Date of Patent: Apr. 7, 2026

(54) FUNCTIONAL SAFETY PROTECTION MECHANISM SELF-TEST

(71) Applicant: JAGUAR LAND ROVER LIMITED, Warwickshire (GB)

(72) Inventors: Adrian Bouaru, Coventry (GB); Thomas Papanikolaou, Coventry (GB)

(73) Assignee: JAGUAR LAND ROVER LIMITED, Whitley (GB)

( * ) Notice: Subject to any disclaimer, the term of this patent is extended or adjusted under 35 U.S.C. 154(b) by 182 days.

(21) Appl. No.: 18/702,493

(22) PCT Filed: Oct. 18, 2021

(86) PCT No.: PCT/EP2021/078793
§ 371 (c)(1),
(2) Date: Apr. 18, 2024

(87) PCT Pub. No.: WO2023/066444
PCT Pub. Date: Apr. 27, 2023

(65) Prior Publication Data
US 2024/0408930 A1     Dec. 12, 2024

(51) Int. Cl.
*B60G 17/0185*     (2006.01)
(52) U.S. Cl.
CPC .... *B60G 17/0185* (2013.01); *B60G 2600/084* (2013.01)
(58) Field of Classification Search
CPC ............ B60G 17/0157; B60G 17/0185; B60G 21/0555; B60G 2202/42; B60G 2202/442;
(Continued)

(56) References Cited

U.S. PATENT DOCUMENTS

| | | | |
|---|---|---|---|
| 11,584,185 B1 * | 2/2023 | Schubart | .............. B60G 17/018 |
| 2007/0271014 A1 * | 11/2007 | Breed | .................... G07C 5/008 |
| | | | 701/31.9 |

(Continued)

FOREIGN PATENT DOCUMENTS

| | | | | |
|---|---|---|---|---|
| CN | 110826143 A | * | 2/2020 | ......... B60G 17/0185 |
| DE | 102013209527 | | 11/2014 | |

(Continued)

OTHER PUBLICATIONS

International Search Report and Written Opinion for International Application No. PCT/EP2021/078793 mailed Jun. 14, 2022.

*Primary Examiner* — Atul Trivedi
(74) *Attorney, Agent, or Firm* — Carlson, Gaskey & Olds, P.C.

(57)     ABSTRACT
Aspects of the present invention relate to a control system (100, 200) for a vehicle suspension system of a vehicle (800). The control system is configured to perform a test for testing operation of an isolation switch (430). The vehicle suspension system comprises an actuator power supply (450) configured to supply power to the vehicle suspension system. The actuator power supply is configured to be electrically connected to the vehicle suspension system via the isolation switch. The control system is configured to: receive a shutdown indicator signal indicating that the vehicle is in a shutdown state (530); output an open isolation switch signal (524) configured to open the isolation switch in dependence on the shutdown indicator signal; receive an open isolation switch confirmation signal (516) indicative of the isolation switch being open; determine whether the open isolation switch confirmation signal is received within a predetermined time period; and output a test pass signal or a test failure signal in dependence on the determination.

15 Claims, 7 Drawing Sheets

800

(58) Field of Classification Search
 CPC .......... B60G 2400/30; B60G 2600/042; B60G
 2600/084
 USPC ....................................................... 701/31.7
 See application file for complete search history.

(56) References Cited

U.S. PATENT DOCUMENTS

| | | | | |
|---|---|---|---|---|
| 2008/0065290 A1* | 3/2008 | Breed | ..................... | G01L 17/00 |
| | | | | 701/31.4 |
| 2008/0086240 A1* | 4/2008 | Breed | ................... | G07C 5/008 |
| | | | | 701/1 |
| 2008/0156406 A1* | 7/2008 | Breed | ................ | B60C 23/0433 |
| | | | | 152/415 |
| 2008/0216567 A1* | 9/2008 | Breed | ................... | B60R 21/013 |
| | | | | 73/146.5 |
| 2017/0182859 A1* | 6/2017 | Anderson | .............. | F03G 7/081 |
| 2019/0031199 A1* | 1/2019 | Dudar | .................. | B60W 40/02 |
| 2019/0054792 A1* | 2/2019 | Grodde | ................. | H02H 9/041 |
| 2021/0157312 A1* | 5/2021 | Cella | .................... | H04L 1/0041 |
| 2022/0016949 A1* | 1/2022 | Graus | .................... | B60G 17/08 |

FOREIGN PATENT DOCUMENTS

| | | | | | |
|---|---|---|---|---|---|
| DE | 102019100073 | A1 * | 7/2019 | .............. | F01N 11/00 |
| FR | 2679835 | A1 * | 2/1993 | ......... | B60G 17/0185 |
| FR | 2935640 | | 3/2010 | | |
| IT | MI910022 | A1 * | 7/1992 | ............ | B60G 13/14 |
| WO | WO-2021168512 | A1 * | 9/2021 | .............. | B62D 9/02 |
| WO | WO-2023066451 | A1 * | 4/2023 | ........ | B60W 50/0097 |

* cited by examiner

700

800

FUNCTIONAL SAFETY PROTECTION MECHANISM SELF-TEST

TECHNICAL FIELD

The present disclosure relates to a functional safety protection mechanism self-test for a control system of a vehicle suspension system. Aspects of the invention relate to a control system, to a system, to a vehicle, to a method, and to computer software.

BACKGROUND

Vehicles (for example petrol, diesel, electric, hybrid) comprise active suspension systems, such as electronic active roll control (electronic active roll control) systems, for maintaining vehicle stability. Such electronic active roll control systems comprise at least one actuator, the actuator being coupled to an anti-roll bar and configured to actively impart motor control on the suspension system. To provide the motor control to the actuators of the electronic active roll control system, the electronic active roll control system may be supplied by a dedicated power supply system, such as a 48V supply. Faults arising from an electronic active roll control system, such as unintended actuation (and, consequently, imparted motor control), can lead to undesired path deviation by the vehicle. The electronic active roll control system therefore has a high functional safety integrity requirement (for example a high Automotive Safety Integrity Level", ASIL,). Throughout this disclosure, the term "anti-roll bar" is used and is synonymous with the terms "roll bar", "anti-sway bar", "sway bar" or "stabilizer bar".

Such active suspension systems utilise a number of individual subcomponents, or mechatronic subsystems, which may, individually, have a lower functional safety requirement. These subcomponents may comprise a cascade of: high level vehicle control generating a system demand signal (such as torque demand) to influence vehicle motion; a low level controller providing control signals to an actuator (i.e. to provide motor control) of the electronic active roll control system to deliver the demand signal provided; associated mechanical components to deliver the physical manifestation of the demanded signal; and the power supply system. Various interaction between the indicated subcomponent cascade provide overall operation of the electronic active roll control system.

The electronic active roll control system may operate in an inactive state, or passive state, where no active torque is generated, and no actuation (i.e. imparted motor control) takes place. This state may be achieved via logical conditions, or interrupting the power supply to the electronic active roll control system (for example an interruption of the connection to the dedicated 48V power supply system to the electronic active roll control actuators).

In view of the high functional safety requirement of the electronic active roll control system, it is desirable to be able to pre-emptively diagnose a system failure which may arise within the electronic active roll control system, including the individual subcomponents of the system, before any undesired, potentially hazardous situation occurs. Particularly, it is desirable to test the functionality of the electronic active roll control system for achieving the inactive state (i.e. testing the functionality of the interruption of the power supply). However, testing the interruption of the power supply to achieve the inactive state results in loss of function of the active roll control for the electronic active roll control system, and may increase the risk of damaging subcomponents of the system. Thus, during active use of the vehicle, it can be difficult to non-intrusively perform any such functional test on the electronic active roll control system, in order to pre-emptively diagnose any system faults.

Therefore, it is an aim of the present invention to address one or more of the disadvantages associated with the prior art.

SUMMARY OF THE INVENTION

A possible solution disclosed herein to the above-detailed problem is to perform a functional test of an isolation switch for interrupting to a power supply, when specific conditions of the vehicle are detected. Such conditions may apply when the vehicle has initiated a shutdown state (i.e. one or more control modules, or control systems, cease, or start to cease operation). During shutdown of the control modules to the power supply system, the isolation switch may be opened, to interrupt power delivery to the electronic active roll control system. This may allow for the electronic active roll control system to be tested in a non-intrusive manner, without affecting vehicle performance, as detailed below.

Aspects and embodiments of the invention disclosed herein provide a control system, to a system, to a vehicle, to a method, and computer software, as claimed in the appended claims.

According to an aspect of the present invention there is provided a control system for a vehicle suspension system of a vehicle. The control system comprises one or more controllers and is configured to perform a test for testing operation of an isolation switch. The vehicle suspension system comprises an actuator power supply configured to supply power to the vehicle suspension system. The actuator power supply is configured to be electrically connected to the vehicle suspension system via the isolation switch. The control system is configured to: receive a shutdown indicator signal indicating that the vehicle is in a shutdown state; output an open isolation switch signal configured to open the isolation switch in dependence on the shutdown indicator signal; receive an open isolation switch confirmation signal indicative of the isolation switch being open; determine whether the open isolation switch confirmation signal is received within a predetermined time period; and output a test pass signal or a test failure signal in dependence on the determination.

The control system may be further configured to, if the open isolation switch confirmation signal is received from the power supply system within the predetermined reaction period, record the test pass in a test log.

The control system may be further configured to, if no open isolation switch confirmation signal is received from the power supply system within the predetermined reaction period, record the test failure in a test log. The control system may be further configured to, if a closed isolation switch signal indicative of the isolation switch being closed is received, record the test failure in the test log.

A shutdown procedure may continue to cause one or more further vehicle control systems connected to the control system to cease operation.

The control system may be further configured to determine if a number of consecutive test failures recorded in the test log reaches a predetermined failure threshold; and if the number of consecutive test failures meets the predetermined failure threshold, provide an output indicating an isolation switch operation fault.

The control system may be further configured to, in dependence on the number of consecutive test failures meeting the predetermined failure threshold, perform a shutdown procedure to cause one or more further vehicle control systems connected to the control system to cease operation; and provide the output indicating the isolation switch operation fault on initiation of an ignition cycle following the shutdown procedure.

The control system may be further configured to determine if a number of consecutive test passes recorded in the test log reaches a predetermined pass threshold for a current drive cycle; if the number of consecutive test passes is less than the predetermined pass threshold, operate in a first testing phase for the current drive cycle, wherein a subsequent test is performed in response to receipt of a next shutdown indicator; and if the number of consecutive test passes is equal to or above the predetermined pass threshold, operate in a second testing phase for the current drive cycle, wherein a subsequent test is performed less frequently in the second testing phase than in the first testing phase.

The control system may be further configured to, following receipt of the shutdown indicator signal and prior to determining whether an open isolation switch confirmation signal is received, in response to a start-up indicator signal indicating that the vehicle is in a start-up state, abort a current test being performed, and perform a next test in dependence on receipt of a further shutdown indicator.

The predetermined time period may be determined in dependence on an expected time taken for the open isolation switch confirmation signal to be transmitted from the isolation switch and received by the control system. The expected time taken may be further determined in dependence on an expected time for the isolation switch to open. Transmission of the "open isolation switch confirmation signal" from the isolation switch may comprise transmission from a module controlling or managing operation of the open isolation switch confirmation signal. For example, the predetermined time period may cover: a) the time it takes for the component to react to the isolation demand, and update the signal; b) publish the data on the communication bus, and c) the time taken for the control system to receive the feedback.

The control system may be further configured to, after determining receipt of the open isolation switch confirmation signal, continue the shutdown procedure to cause one or more further vehicle control systems connected to the control system to cease operation.

The shutdown indicator may further comprises at least one of: an indication of a current vehicle power mode; an indication of a power down sequence of the actuator power supply having commenced; a voltage level of the actuator power supply being within a predetermined voltage range; a current level of the actuator power supply being below a predetermined current threshold; and an indication that the isolation switch is in a closed position.

In a further aspect there is provided a system, comprising: any control system disclosed herein; a vehicle suspension system, comprising at least one actuator; and an actuator power supply electrically connected to the vehicle suspension system by an isolation switch.

In a further aspect there is provided a vehicle comprising any control system disclosed herein or any system disclosed herein.

In a further aspect there is provided a method for a control system of a vehicle suspension system, The vehicle suspension system comprises an actuator power supply configured to supply power to the vehicle suspension system. The actuator power supply is configured to be electrically connected to the vehicle suspension system via an isolation switch. The method comprises: receiving a shutdown indicator indicating that the vehicle is in a shutdown state: outputting an open isolation switch signal, the open isolation switch signal configured to cause the isolation switch to open; receiving an open isolation switch confirmation signal indicative of the isolation switch being open; determining whether an open isolation switch confirmation signal is received within a predetermined time period; and outputting a test pass or test failure in dependence upon receipt of the open isolation switch confirmation signal.

In a further aspect there is provided computer readable instructions which, when executed by a processor of any control system disclosed herein, are arranged to perform any method disclosed herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Active suspension systems, such as electronic active roll control utilizing mechatronic systems, may include a cascade of systems, such as:

(a) a high level vehicle control layer, which may generate system demand signals (for example torque demands) to influence vehicle motion;

(b) a low level control layer, which may provide control signals to actuators (for example motor control) to deliver the demanded signal from the high level control; and (c) a physical actuation layer, comprising motors and associated mechanical components to deliver the physical manifestation of the demanded signal.

There may be a part of the active suspension system which it is desirable to test for correct functioning during normal operation of the vehicle, but to do so is not easily possible because the test may interfere with the expected operation of the vehicle. For example, it is desirable to be able to test for the expected functioning of isolation switches which are intended to cause electrical isolation of a component of the system, for example in the event of a detected fault. However, testing such isolation switches cannot readily be performed during normal operation of the vehicle because testing that the switch opens, when instructed to do so, would interfere with the operation of the vehicle. On the other hand, the vehicle must be in some operative state for the test to be performed, because if the vehicle systems were all switched off (i.e. unpowered) then it would not be possible to detect if the isolation switch had operated snice there is no powered system to monitor for electrical isolation. In the example of an isolation switch configured to isolate the power supply system from the active suspension system, causing electrical isolation for the purposes of a test may cause unintended actuation of the active suspension systems and potentially unintended vehicular deviation from an expected path. Examples disclosed herein allow for such isolation switches to be tested in a test procedure which operates when the vehicle systems are being powered down, and thus there is no normal operation taking place (i.e. no power is being drawn).

Figure 1:
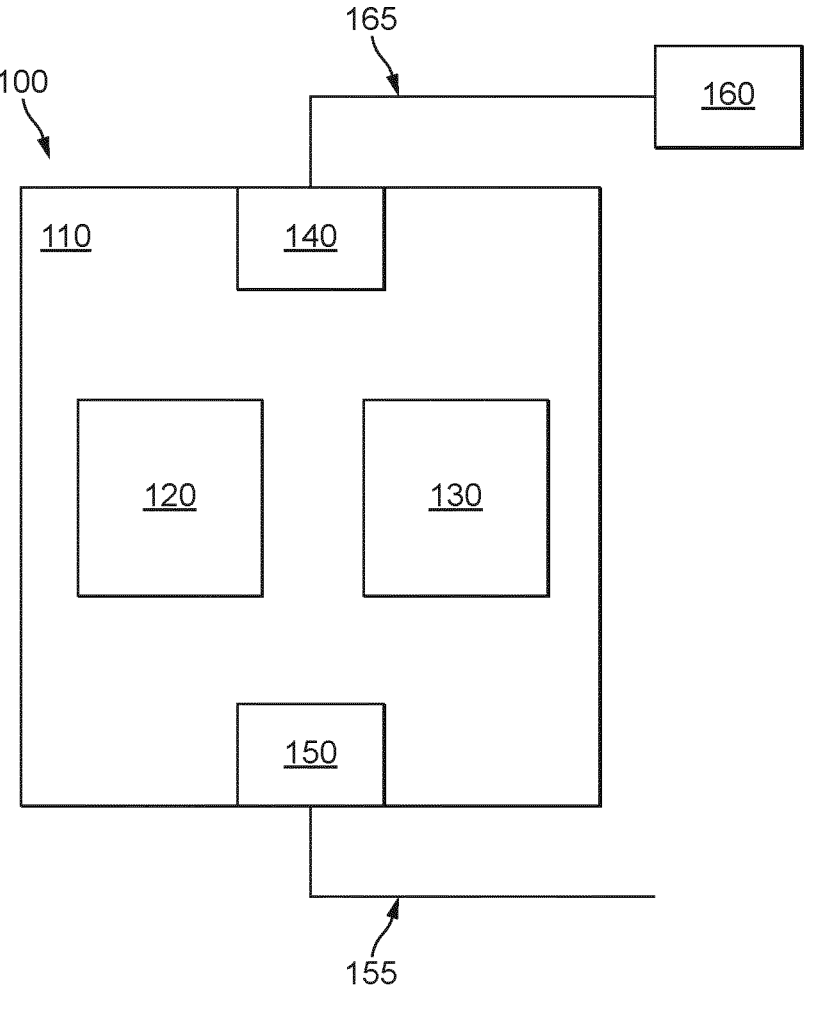
FIG. 1 shows a controller of a control system according to examples disclosed herein.

The control system 100 as illustrated in FIG. 1 comprises one controller 110, although it will be appreciated that this is merely illustrative. The controller 110 comprises processing means 120 and memory means 1130. The processing means 120 may be one or more electronic processing device 120 which operably executes computer-readable instructions. The memory means 130 may be one or more memory device 130. The memory means 130 is electrically coupled to the processing means 120. The memory means 130 is configured to store instructions, and the processing means 120 is configured to access the memory means 130 and execute the instructions stored thereon.

The controller 110 comprises an input means 140 and an output means 150. The input means 140 may comprise an electrical input 140 of the controller 110. The output means 150 may comprise an electrical output 150 of the control system 100. The input 140 is configured to receive one or more input signals 165, for example from a sensor 160. The inputs may be either physical (for example from a hard wired sensor) and/or may be from a vehicle communication bus. There may be one or more sensors which provide information to the controller input 140. The output 150 is configured to provide one or more output signals 155.

In an example, the control system 100 may be for a vehicle suspension system of a vehicle. The control system is configured to perform a test for testing operation of an isolation switch. The vehicle suspension system comprises an actuator power supply configured to supply power to the vehicle suspension system, and the actuator power supply is configured to be electrically connected to the vehicle suspension system via the isolation switch. In such an example, the input 140 is arranged to receive a shutdown indicator signal as an input signal 165 indicating that the vehicle is in a shutdown state. The control system 100 is configured to output an open isolation switch signal as an output signal 155, which is configured to open the isolation switch in dependence on receipt of the shutdown indicator signal as an input signal 165. Thus the switch is forced to open to test its operation. This may be considered to simulate a fault with the system, and the test checks that the isolation switch operates as intended in the event of a real life fault, i.e. by opening to isolate the active suspension actuators from the power supply.

The input 140 is also arranged to receive an open isolation switch confirmation signal as an input signal 165 indicative of the isolation switch being open. The control system 100 is configured to determine whether the open isolation switch confirmation signal as an input signal 165 is received within a predetermined time period. Then, the controller is configured to, in dependence on the determination, provide via the output 150, a test pass signal or a test failure signal as an output signal 155. For example, if the open isolation switch confirmation signal received within the predetermined time period, the control system 100 may output a test failure signal as an output signal 155. Thus, the open isolation switch signal as an output signal 155 is an intentional planned demand for the switch to open, and the expected result of the transmission of the open isolation switch signal as an output signal 155 is monitored by the control system 100 to await a confirmation signal within the predetermined time, which when received, may be interpreted as an expected response to the intentional open isolation switch signal as an output signal 155, and successful operation of the isolation switch as intended. The term "test pass signal" may be understood to be a sensor output which is processed elsewhere for categorisation as a test pass i.e. as a sensor signal consistent with the switch being determined to operate as expected and thus the test being passed. Similarly, the term "test fail signal" may be understood to be a sensor output which is processed elsewhere for categorisation as a test fail i.e. as a sensor signal consistent with the switch being determined not to operate as expected (i.e. faulty operation is positively detected), or consistent with the switch not being determined to operate as expected (i.e. no information is received indicating correct operation) and thus the test being passed. Further examples are discussed below.

Figure 2:
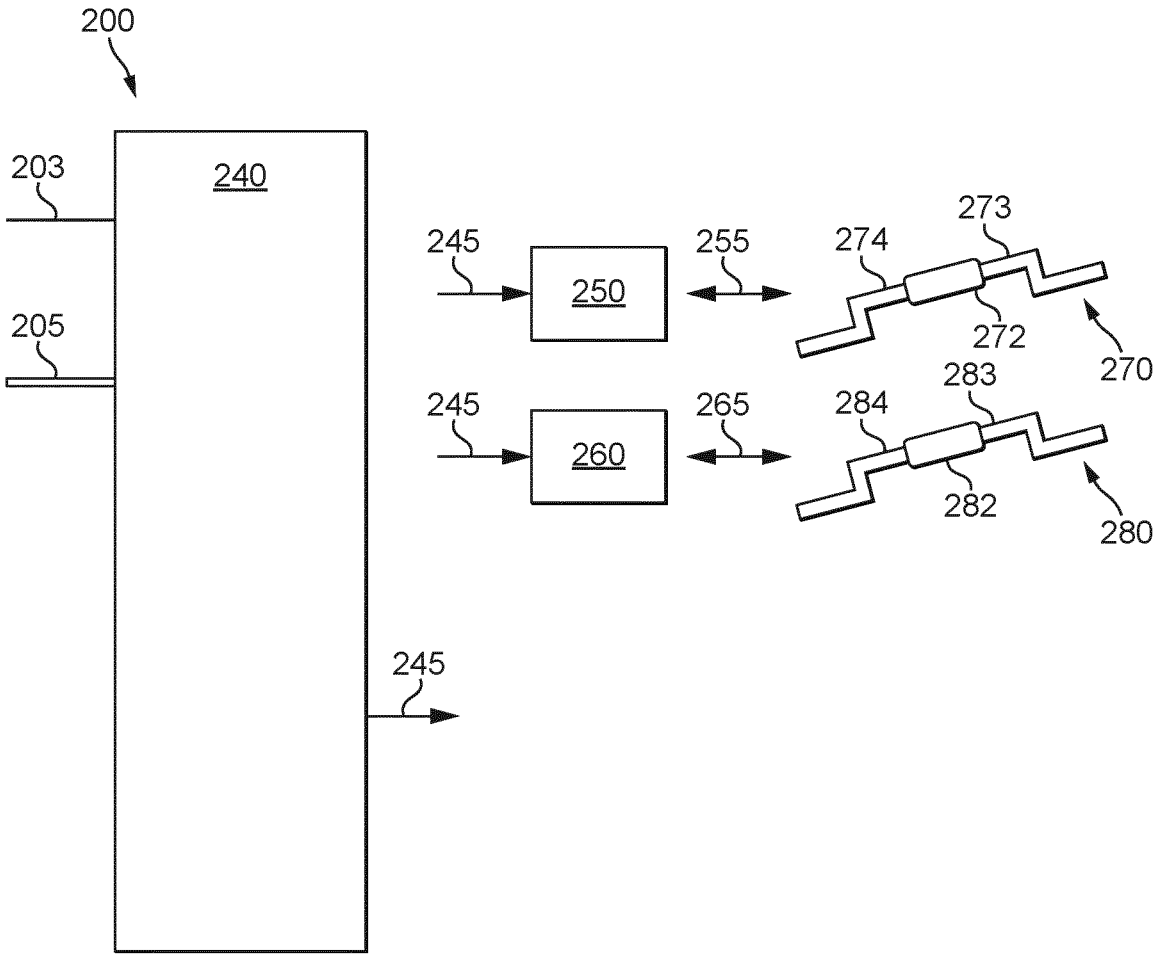
FIG. 2 shows an example control system for a vehicle connected to front and rear anti-roll bars according to examples disclosed herein.
Figure 3:
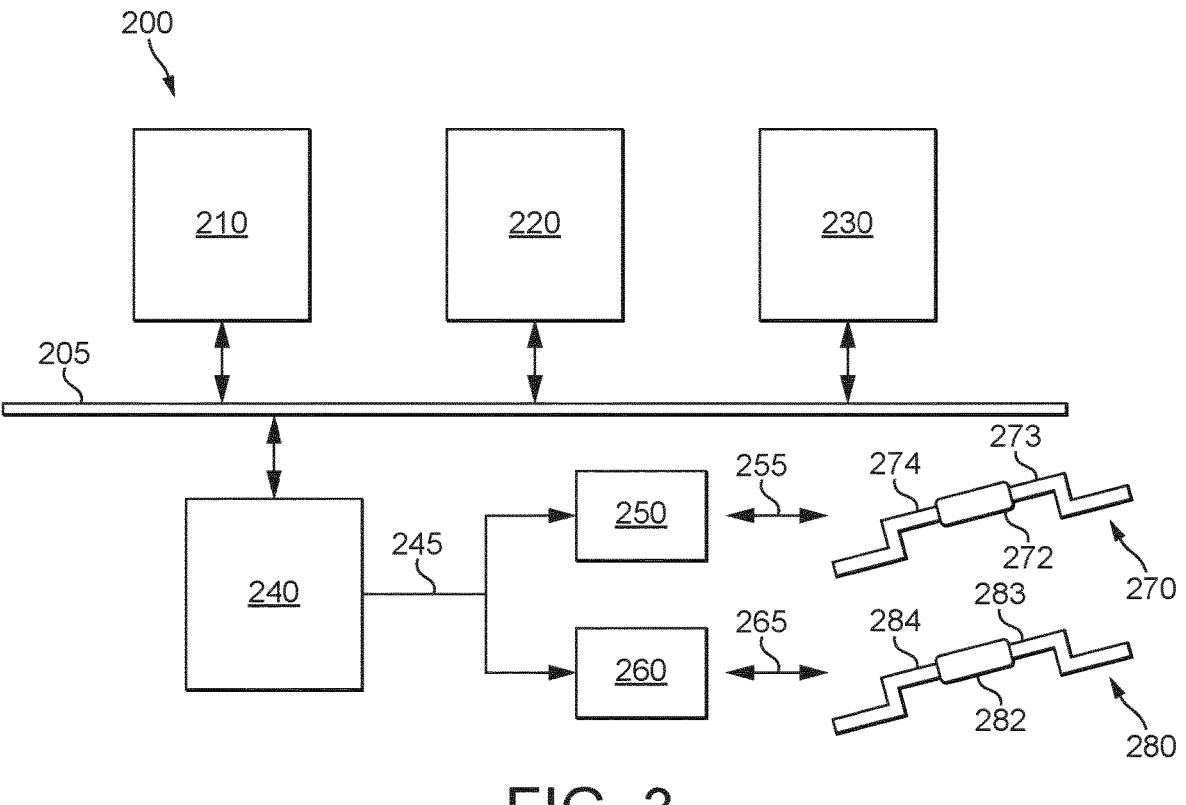
FIG. 3 shows an example control system for a vehicle comprising plural sub-systems, and front and rear anti-roll bars, according to examples disclosed herein.

FIGS. 2 and 3 illustrate an example control system 200 for a suspension system of a vehicle. A suspension system of a vehicle may comprise anti-roll bars 270, 280 which are controlled using an anti-roll control system. The anti-roll control system acts to control the anti-roll bars, to control a roll of a body of the vehicle and reduce the impact of disturbances from a road surface. The anti-roll control system may be electromechanical and/or hydraulic. Anti-roll bars 270, 280 may typically comprise stabiliser bars, typically metal, which join the vehicle suspension on either side of the vehicle axle, usually through drop links, and connect to a rotational actuator situated between the mounting points to the vehicle chassis. Each side of the anti-roll bar is able to rotate freely when a motor of the anti-roll control system is not energised. When the motor control is enabled (i.e. delivering torque), the anti-roll bar may act as a torsional spring. The anti-roll bars may be controlled to compensate for some vehicle movements such as body roll, for example from driving around a corner. Body roll can cause the wheels at the side of the vehicle outside the turn to reduce their contact with the road surface. Anti-roll bars may be controlled to counteract this effect and reduce the body roll effect, by transferring at least part of the additional load on the wheels at the side of the vehicle inside the turn to those wheels at the outside, for example by providing a torsional effect to pull the wheels towards the chassis and even out the imbalance in load on the wheels caused by cornering.

A typical suspension system may comprise passive front and rear anti-roll bars provided respectively between the front and rear pairs of wheels of a standard four-wheel vehicle. In a vehicle with an active roll control system, an anti-roll bar 270, 280 may respectively each comprise two anti-roll bar ends 273, 274; 283, 284 connected together by a central housing having an actuator 272, 282. The central housing may additionally have one or more of a gearbox, sensors, and dedicated actuator controllers. The actuator 272, 282 acts to provide an actively controlled torque rather than a fixed torsional stiffness provided by passive anti-roll bars. One or more sensors may monitor the movement of the vehicle, and provide the sensed parameters as input to the active roll control system to control the actuator and provide a suitable torque to the anti-roll bar. The two ends of the anti-roll bar 273, 274; 283, 284 may be identical, or may be non-identical.

FIG. 2 shows an example control system 200 for a suspension system a vehicle, communicatively connected to front and rear anti-roll bars 270, 280. The control system 200 comprises a controller 240 which is connected by a communication channel 245 to anti-roll bar controllers 250, 260 configured to respectively control front and rear anti-roll actuators 272, 282. The controller 240 may be the controller 110 of FIG. 1. The controller 240 may comprise one or more of the controllers 110 of FIG. 1. In an example, the controller 240 may be a master controller for an electronic active roll control system in the vehicle. The controller 240 may host a vehicle level control strategy and actuation control for the electronic active roll control system in the vehicle.

The controller 240 may be configured to receive one or more sensor signal 203 from one or more sensors attached to the vehicle. The one or more sensor signals 203 may comprise, for example, a signal from a respective suspension height sensor of the vehicle suspension; a signal from a respective motor position sensor for the anti-roll bar actuators 272, 282; a signal from a respective hub acceleration sensor of the vehicle; and a signal from a respective torque sensor for the anti-roll bar actuators 272, 282. A suspension height sensor may be configured to determine a sensor signal indicative of one or more of a height of a left side and a height of a right side of the vehicle suspension. A motor position sensor may be configured to determine a sensor signal indicative of a position of a respective motor of the anti-roll bar actuators 272, 282. A hub acceleration sensor may be configured to determine a sensor signal indicative of an acceleration of one or more hub of a wheel of the vehicle. A torque sensor may be configured to provide a measure of an existing torque generated in the system, as a result of a target torque demand being requested by the controller.

The controller 240 may be configured to receive one or more communication signals via a communications bus 205. The communications bus 205 may be configured to deliver data to the controller 240 from other subsystems within the vehicle. For example, the communications bus 205 may be configured to communicate a signal indicating a status of one or more modules 210, 220, 230 that are in communicative connection with the controller 240 to the controller 240. In another example, the communications bus 205 may be configured to communicate a command from the controller 240 to the one or more modules 210, 220, 230 that are in communicative connection with the controller 240. The one or more modules 210, 220, 230, are discussed further in relation to FIG. 3 below. Signals transmitted over connections 203 or 245 may alternatively or additionally be transmitted over communications bus 205.

The controller 240 may be configured to generate system demand signals to influence a vehicle's motion via the anti-roll actuators 272, 282. An actuator provided between a front pair of wheels of a vehicle may be called a front actuator. A front active roll control (FARC) module may be electrically connected to the front actuator, and may comprise the controller 250 to control the front actuator 272. Similarly, an actuator provided between a rear pair of wheels of a vehicle may be called a rear actuator. A rear active roll control (RARC) module may be electrically connected to the rear actuator and may comprise a controller 260 to control the rear actuator 282.

The front and rear anti-roll actuators 272, 282 each comprise an electric motor which is controllable by the respective anti-roll controller 250, 260. Each of the front and rear anti-roll actuators 272, 282 may be controlled by its own respective anti-roll controller in some examples, or multiple anti-roll actuators may be controlled by a common anti-roll controller in some examples. Each of the anti-roll actuators 272, 282 may be individually controlled in some cases to improve the management of the roll of the body of the vehicle. The front and rear anti-roll actuators 272, 282 may be controlled by a control signal which is generated by the controller 240 may generate and output, through the output channel 245, to the anti-roll bar controllers 250, 260. The control signal may carry instructions to be implemented by the actuator, for example by providing a torque to apply to the anti-roll bar. For example, as discussed above, when the vehicle is cornering, a control signal may be transmitted to the anti-roll bar controllers 250, 260, which may in turn transmit a control signal via interface 255, 265 so that the front and read anti-roll actuators 272, 282 may mitigate a body roll effect. Similarly, anti-roll bar controllers 250, 260 may transmit measured values from the anti-roll actuators to the controller 240 through output channel 245.

FIG. 3 shows an example control system 200 for a vehicle comprising one or more modules 210, 220, 230, a controller 240 and front and rear anti-roll bars 270, 280. As in FIG. 2, the control system 200 comprises a controller 240 which is connected by a communication channel 245 to controllers 250, 260 configured to respectively control front and rear anti-roll bar actuators 272, 282. Further, the controller 240 of the control system 200 is in a communicative connection to the one or more modules 210, 220, 230 via a communications bus 205. The one or more modules 210, 220, 230 may be configured to perform functions relating to power supply of the suspension system. Module 210 may be a power control module configured to control a power supply system for the suspension system. Module 220 may be a conversion module configured to convert electrical energy output from the vehicle power supply system. In an example, the conversion module 220 may comprise a DC-DC converter. Module 230 may be a capacitor or supercapacitor module configured to store electrical energy for the suspension system. Together, conversion module 220 and capacitor module 230 may be configured to supply electrical energy to the controllers 250, 260, such that the anti-roll bar actuators 272, 282 can be actuated. FIG. 3 illustrates these modules 210, 220, 230 as individual modules. However, there may be examples whereby components within the modules 210, 220, and 230 are included in a single module. Similarly, communications links 205 and 245 may be the same in some examples.

Figure 4:
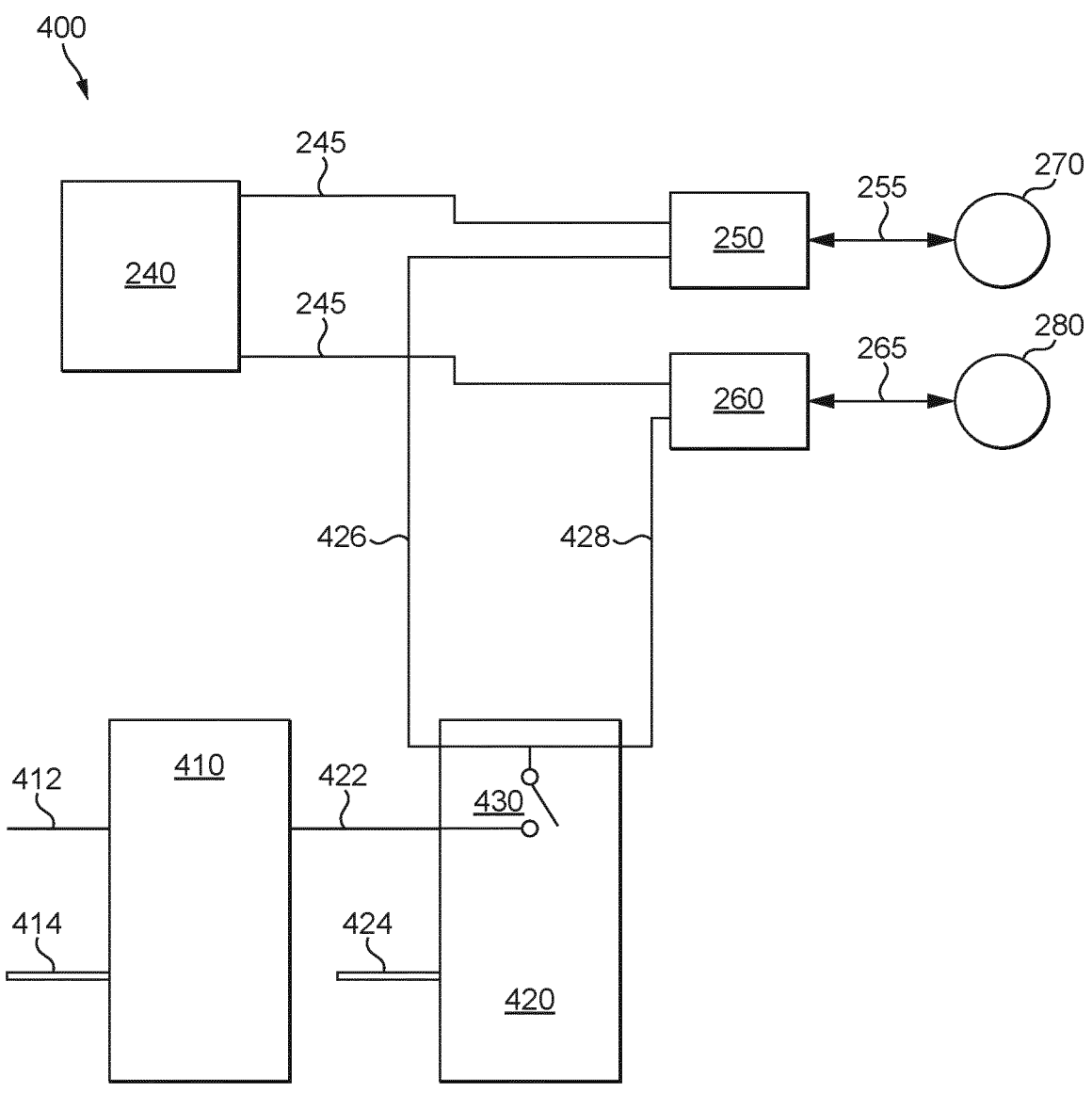
FIG. 4 shows an example control system for a vehicle suspension system according to examples disclosed herein.

FIG. 4 shows an example control system 400 for a vehicle suspension system. Controller 240 is present as in FIGS. 2 and 3, which is connected by a communication channel 245 to anti-roll bar controllers 250, 260 configured to respectively control front and rear anti-roll actuators 272, 282. Also shown in FIG. 4 is a power converter module 410 and an electrical energy storage module 420. The power converter module 410 may comprise, for example, a bidirectional DCDC power converter. The electrical energy storage module 420 (in the same way as module 230 in FIGS. 2*a*-*b*) may be considered to be a subcomponent of the power supply in some examples as it is used to provide electrical power to the actuators 272, 282 via the anti-roll bar controllers 250, 260 via electrical connections 252; 262. The actuator controllers 250, 260 are communicatively linked with the via respective communication bus connections 255, 265. The electrical energy storage module 420 may comprise a supercapacitor energy storage module in some examples. The power converter module 410 may receive energy from a vehicle battery via power connection 412. The power converter module 410 may receive control inputs via communications bus 414. The electrical energy storage module 420 may receive energy from the power converter module 410 via power connection 422. The electrical energy storage module 420 may receive control inputs via communications bus 424. In this example, communication buses 414, 424 and 205 are the same communication bus. The electrical energy storage module 420 is also in electrical connection with the anti-roll bar controllers 250, 260 via respective connections 426, 428.

The electrical energy storage module 420 also comprises an isolation switch 430. The isolation switch is configured to connect the electrical energy storage module 420 to the anti-roll bar controllers 250, 260 when closed, and isolate the electrical energy storage module 420 from the anti-roll bar controllers 250, 260 when open.

It will be appreciated that the control systems 200, 400 of FIGS. 2-4 may comprise one or more further connected controllers in some examples, and/or one or more further electrical or communication connections.

Figure 5:
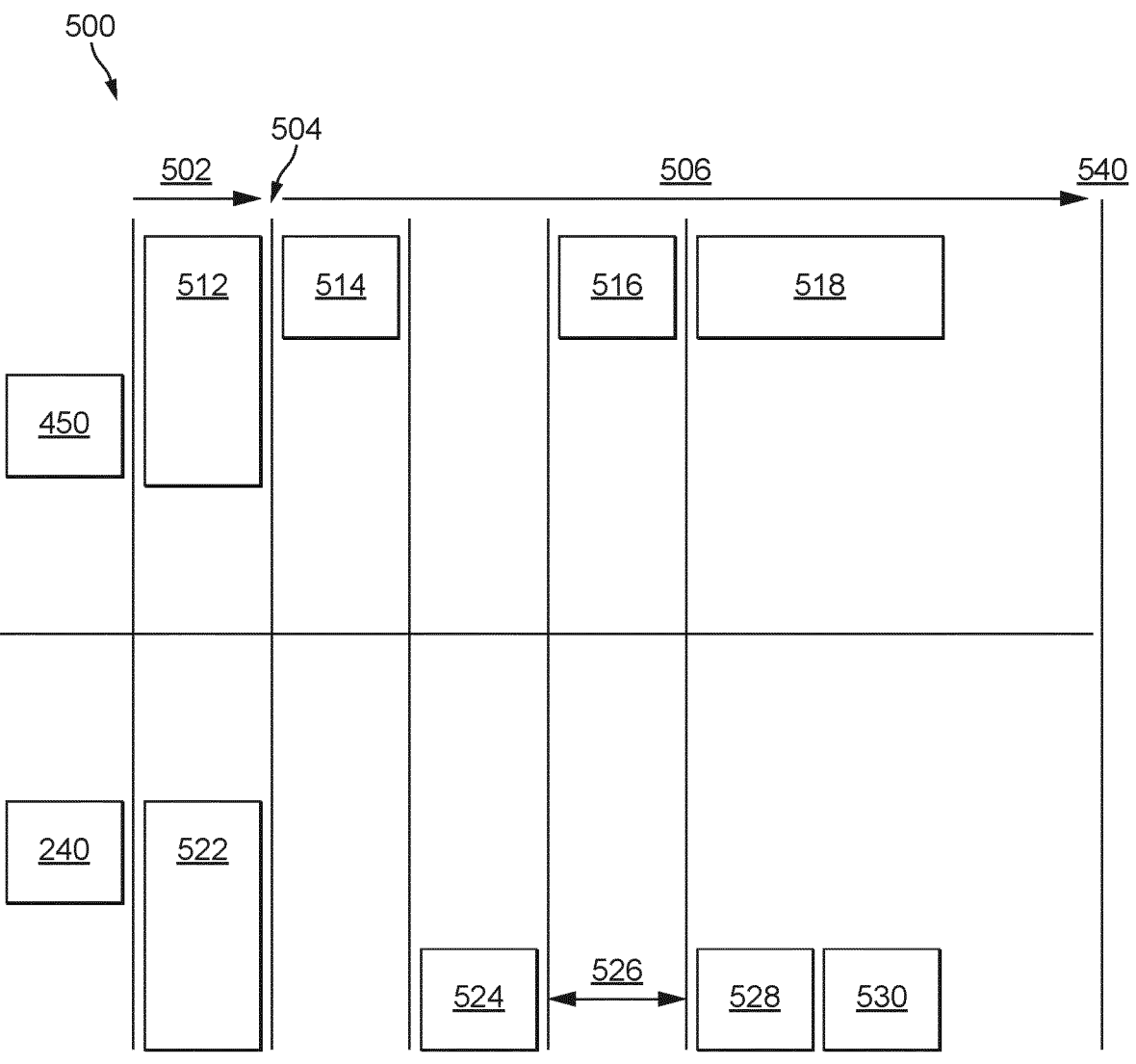
FIG. 5 shows an example process flow in a control system according to examples disclosed herein.

FIG. 5 illustrates a process flow 500 for a control system 200. As discussed above, the control system 200 is configured to perform a test of the operation of an isolation switch 430 for interruption of a connection of the actuator power supply 450 to the vehicle suspension system (i.e. to the anti-roll bar controllers 250, 260 of the electronic active roll control system). FIG. 5 illustrate processes taking place along a timeline from left to right as illustrated, in the electrical energy storage module 420 and in the control system 200.

Referring to FIG. 5, initially, the actuator power supply 450 and the controller 240 are operating in a normal mode, represented by block 512 and block 522, respectively, during a drive cycle 502 of the vehicle (i.e. the vehicle is being, or can be driven, and the ignition is ON). A drive cycle may be defined as a time period between two consecutive power on or power off events. During a drive cycle 502 the isolation switch 430 is in a closed position, and connecting the actuator power supply 450 and the anti-roll bar controllers 250, 260. At an ignition OFF point 504, a shutdown indicator signal is received that a shutdown state has been initiated (i.e. an instruction, or signal, is received that the ignition is switched OFF). The vehicle begins to enter a shutdown process 506. During a shutdown process, power modules (i.e. such as the actuator power supply 450) begin to cease operation. Thus, following initiation of the shutdown state 506, the actuator power supply 450 initiates a shutdown procedure, where at least one module of the actuator power supply ceases, or begins to, cease operation.

During the vehicle shutdown procedure 506, the actuator power supply 450 initiates a shutdown state 514, and a shutdown signal is received by the controller 240 from the actuator power supply 450 indicating that a shutdown state has been entered. The shutdown signal indicator of the shutdown state may be an indication of a current vehicle power mode (i.e. the vehicle power mode being at 0). Additionally, the shutdown signal indicator may be an indication of a power down sequence of the actuator power supply 450 having commenced. Additionally, or alternatively, the controller 240 may determine that the actuator power supply 450 has entered a shutdown state upon the a voltage level of the actuator power supply 450 being within a predetermined voltage range and/or a current level of the actuator power supply being below a predetermined current threshold. For example, the voltage level on the actuator power supply 450 may fall with +/−2V of a predetermined voltage threshold—i.e. a storage voltage threshold—and/or the current level may be approximately 0 A (for example +/−2 A). The shutdown signal indicator may further indicate that the isolation switch is in a closed position.

In a further example, the shutdown signal indicator from the actuator power supply 450, to indicate that it has entered a shutdown state, may include all of the above indications.

In response to receipt of the indication that the actuator power supply 450 has entered a shutdown state 514, the controller 240 issues an open isolation switch signal 524 to open the isolation switch 430, and monitors 526 (i.e. waits) for confirmation of the isolation switch 430 being open in response to the issued signal 524.

The controller 240 then receives a confirmation signal 516 indicative that the isolation switch 430 is open, and proceeds to determine whether the open isolation switch confirmation signal 516 is received within a predetermined time period. In other words, the controller 240 determines whether the isolation switch 430 is opened in response to the open isolation switch signal 524 sent by the controller 240 when the confirmation signal 516 is received within the predetermined time period. Or, when received outside of the predetermined time period, it may be determined by the controller 240 that the open isolation switch conformation has been received as part of normal shutdown procedure of the actuator power supply 450 rather than in direct response to the open test signal 524. If after the pre-determined time period elapsed, the isolation switch 430 is not confirmed as being open by the controller 240, through receipt of the isolation switch open signal, then the controller 240 may treat this lack of receipt of isolation switch open signal as a fail state (error condition). Once the isolation switch is open, the actuator power supply 450 continues shutdown procedure 518.

The predetermined time period may be determined based at least in part on an expected (i.e. calibrated) time taken for the open isolation switch confirmation signal 516 to be transmitted from the module controlling the isolation switch (for example electrical energy storage module 230; actuator power supply module 450) and received by the controller 240. The predetermined time period (or expected time) may be further determined in dependence based on an expected time for the isolation switch to open, and the expected time for the open isolation switch signal to be transmitted over a communication bus connecting the isolation switch and the control system.

may be determined in dependence on an expected time taken for the open isolation switch confirmation signal to be transmitted from the isolation switch and received by the control system. The expected time taken may be further determined in dependence on an expected time for the isolation switch to open. For example, the predetermined time period may cover: a) the time it takes for the component to react to the isolation demand, and update the signal; b) publish the data on the communication bus, and c) the time taken for the control system to receive the feedback.

The controller 240 outputs, and may record 528, whether a test pass or test failure has been received in response to the determination whether or not the isolation switch 430 has opened in response to the open isolation switch signal 524. The controller 240 may store 528 the test pass or test failure result in a test log of the controller 240. In other words, if the open isolation switch confirmation signal 516 is received from the power supply system 450 within the predetermined reaction period, a test pass may be determined, and recorded, in the test log. If no open isolation switch confirmation signal 516 is received within the time period, or if a closed isolation switch signal indicative of the isolation switch being closed is received (i.e. an indication that the switch has failed to open), the controller 240 may record a test failure in the test log. If no data is received for example there is a communication failure or a missing expected message), the test may abort, and the normal shutdown procedure may be executed. The controller 240 then continues a shutdown procedure 518, and enters a shutdown state 530. At 540 the vehicle completes a shutdown (i.e. all control units of the vehicle cease operation).

In some examples, recordal of a test pass or a test fail may take place as follows: If a test is marked as fail, this may cause a fail counter to be stored in the (for example non-volatile) memory of the controller 240 to be incremented by one. This fail counter value may then be used to determine if the number of failures is above a predefined threshold. If a test is marked as a pass, the fail counter may be reset to 0 so that counting for a number of consecutive fails can re-start. The fail counter may constitutes a variable, which is stored in (for example non-volatile) memory, and which may be updated periodically at shutdown, once a test is completed (i.e. to indicate a pass or fail). Examples of non-volatile memory include EPROM or EEPROM memory of the controller, for example. Thus a "test log" may include a counter recording a number of test fails, and/test passes.

Figure 6:
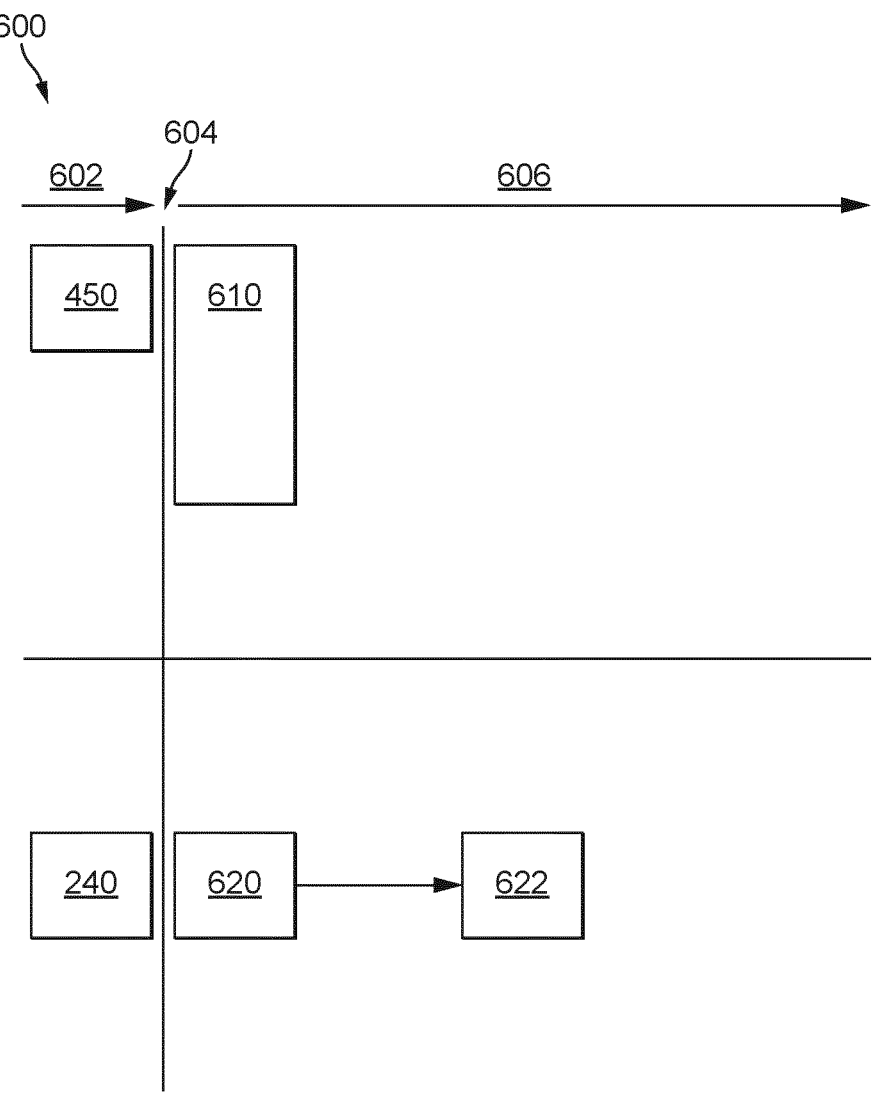
FIG. 6 shows an example process flow in a control system according to examples disclosed herein.

FIG. 6 illustrates a process flow 600 for a controller 240. The controller 240 and actuator power supply 450 are initially in a shutdown state 602 (for example, shutdown subsequent to the processes of FIG. 5 being performed). At a point 604, a start-up signal is received from the user (i.e. the ignition is ON), i.e. a driving mode 606, or state, of the vehicle is initiated. The actuator power supply 450 enters a normal function 610 state (i.e. a normal, powered operation).

Once a drive cycle 606 has been initiated, the controller 240 monitors 620 for (i.e. determines) the number of consecutive test failures that have been received (recorded) in the test log. The error detection may done in the next drive cycle, when the vehicle is in use, in order to provide an output indicating whether a real issue exists prior to a potential hazardous situation. Particularly, the controller 240 determines from the test log (for example a test fail counter) if a number of consecutive test failures recorded in the test log reaches a predetermined failure threshold for a current drive cycle. If the number of consecutive test failures (for example two) meets the predetermined failure threshold, the control system may perform a shutdown procedure to cause one or more further vehicle control systems connected to the control system to cease operation. Performing a shutdown procedure may include, for example, placing the system in a safe state (for example disabling control, requesting the power supply to isolate, and stopping power transfer). The control system may provide an output to the user indicating a fault. For example, at 620, the controller 240 may output a fault indication to the user. For example, the control system may send a to display a fault indication on a dashboard display of the vehicle informing the user that a fault is detected and to seek assistance.

From the test log (for example from a test fail counter), if the controller 240 determines (i.e. at point 620) that a number of consecutive test passes is less than the predetermined pass threshold, the control system continues to operate (i.e. to continue to perform testing) in a first testing phase for the current drive cycle. In this first testing phase, a subsequent (further) test may be performed each time the vehicle initiates a shutdown state (i.e. in response to receipt of a next shutdown indicator received from the actuator power supply 450). However, if the controller 240 determines that the number of recorded consecutive test passes is equal to or above the predetermined pass threshold, then the controller 240 may operate in a second testing phase for the current drive cycle. In the second testing phase, a subsequent (i.e. the next test) may be performed less frequently than in the first testing phase. In other words, a test may be performed less frequently than on every shutdown state initiated by the vehicle.

After the controller 240 has received the shutdown indicator signal (i.e. at 514 indicating that the actuator power supply 450 is in a shutdown state), if the an indication of a start-up indicator signal is received (i.e. that the vehicle has entered an ignition ON in response to user activation), the controller 240 may abort the current test being performed. For example, if the shutdown indictor signal has been received, but controller 240 has not yet sent the isolation switch demand, or the controller 240 has not yet performed the determination of whether an open switch confirmation signal has been received; the control system aborts the current test. A subsequent (next) test may be performed when the vehicle next enters a shutdown state (i.e. when a next shutdown indicator is received).

Figure 7:
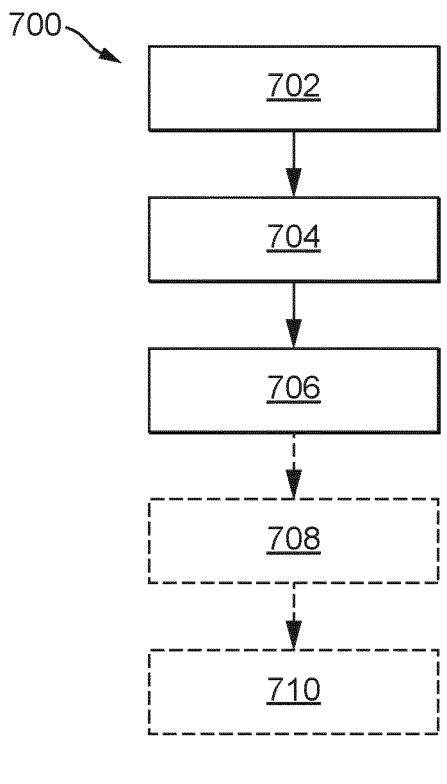
FIG. 7 shows a method according to examples disclosed herein.
Figure 8:
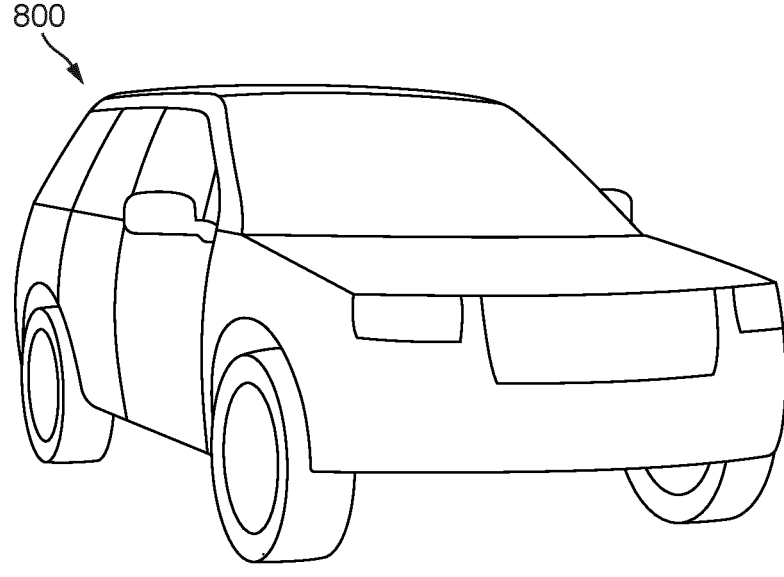
FIG. 8 shows a vehicle in accordance with an embodiment of the invention.

FIG. 7 illustrates a method 700 of a control system for a vehicle suspension system of a vehicle, such as the vehicle 800 illustrated in FIG. 8. The control system as discussed above comprises one or more controllers and the vehicle suspension system comprising an actuator.

The method 700 may be performed by the control system 100 illustrated in FIG. 1. In particular, the memory 130 may comprise computer-readable instructions which, when executed by the processor 120, perform the method 700 according to an embodiment of the invention. The blocks illustrated in FIG. 7 may represent steps in a method 700 and/or sections of code in a computer program configured to control the control system as described above to perform the method steps. The illustration of a particular order to the blocks does not necessarily imply that there is a required or preferred order for the blocks and the order and arrangement of the block may be varied. Furthermore, it may be possible for some steps to be omitted or added in other examples. Therefore, this disclosure also includes computer software that, when executed, is configured to perform any method disclosed herein, such as that illustrated in FIG. 7. Optionally the computer software is stored on a computer readable medium, and may be tangibly stored.

The method 700 comprises: receiving 702 a shutdown indicator indicating that the vehicle is in a shutdown state: outputting 704 an open isolation switch signal, the open isolation switch signal configured to cause the isolation switch to open; receiving 706 an open isolation switch confirmation signal indicative of the isolation switch being open; determining 708 whether an open isolation switch confirmation signal is received within a predetermined time period; and outputting 710 a test pass or test failure in dependence upon receipt of the open isolation switch confirmation signal.

FIG. 8 illustrates a vehicle according to an embodiment of the invention. The vehicle 800 in the present embodiment is an automobile, such as a wheeled vehicle, but it will be understood that the control system and active suspension system may be used in other types of vehicle.

As used here, 'connected' means 'electrically interconnected' either directly or indirectly. Electrical interconnection does not have to be galvanic. Where the control system is concerned, connected means operably coupled to the extent that messages are transmitted and received via the appropriate communication means. It will be appreciated that various changes and modifications can be made to the present invention without departing from the scope of the present application. Whilst endeavouring in the foregoing specification to draw attention to those features believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for a vehicle suspension system of a vehicle, the control system comprising one or more controllers, and configured to perform a test for testing operation of an isolation switch, the vehicle suspension system comprising an actuator power supply configured to supply power to the vehicle suspension system, and the actuator power supply configured to be electrically connected to the vehicle suspension system via the isolation switch, the control system configured to:

receive a shutdown indicator signal indicating that the vehicle is in a shutdown state;

output an open isolation switch signal configured to open the isolation switch in dependence on the shutdown indicator signal;

receive an open isolation switch confirmation signal indicative of the isolation switch being open;

determine whether the open isolation switch confirmation signal is received within a predetermined time period; and output a test pass signal or a test failure signal in dependence on the determination.

2. The control system according to claim 1, further configured to:

if the open isolation switch confirmation signal is received from the power supply system within the predetermined reaction period, record the test pass in a test log.

3. The control system according to claim 1, further configured to one or more of:

if no open isolation switch confirmation signal is received from the power supply system within the predetermined reaction period, record the test failure in a test log; and if a closed isolation switch signal indicative of the isolation switch being closed is received, record the test failure in the test log.

4. The control system according to claim 3, further configured to:

determine if a number of consecutive test failures recorded in the test log reaches a predetermined failure threshold; and if the number of consecutive test failures meets the predetermined failure threshold, provide an output indicating an isolation switch operation fault.

5. The control system of claim 4, further configured to, in dependence on the number of consecutive test failures meeting the predetermined failure threshold, perform a shutdown procedure to cause one or more further vehicle control systems connected to the control system to cease operation; and provide the output indicating the isolation switch operation fault on initiation of an ignition cycle following the shutdown procedure.

6. The control system according to claim 1, further configured to:

determine if a number of consecutive test passes recorded in the test log reaches a predetermined pass threshold for a current drive cycle;

if the number of consecutive test passes is less than the predetermined pass threshold, operate in a first testing phase for the current drive cycle, wherein a subsequent test is performed in response to receipt of a next shutdown indicator; and if the number of consecutive test passes is equal to or above the predetermined pass threshold, operate in a second testing phase for the current drive cycle, wherein a subsequent test is performed less frequently in the second testing phase than in the first testing phase.

7. The control system according to claim 1, further configured to:

following receipt of the shutdown indicator signal and prior to determining whether an open isolation switch confirmation signal is received, in response to a start-up indicator signal indicating that the vehicle is in a start-up state, abort a current test being performed, and perform a next test in dependence on receipt of a further shutdown indicator.

8. The control system according to claim 1, wherein the predetermined time period is determined in dependence on an expected time taken for the open isolation switch confirmation signal to be transmitted from the isolation switch and received by the control system.

9. The control system of claim 8, wherein the expected time taken is further determined in dependence on: an expected time for the isolation switch to open.

10. The control system according to claim 1, further configured to, after determining receipt of the open isolation switch confirmation signal, continue the shutdown procedure to cause one or more further vehicle control systems connected to the control system to cease operation.

11. The control system according to claim 1, wherein the shutdown indicator further comprises at least one of:

an indication of a current vehicle power mode;

an indication of a power down sequence of the actuator power supply having commenced;

a voltage level of the actuator power supply being within a predetermined voltage range;

a current level of the actuator power supply being below a predetermined current threshold; and an indication that the isolation switch is in a closed position.

12. A system, comprising:

the control system according to claim 1;

a vehicle suspension system, comprising at least one actuator; and an actuator power supply electrically connected to the vehicle suspension system by an isolation switch.

13. A vehicle comprising the control system according to claim 1.

14. A method for a control system of a vehicle suspension system, the vehicle suspension system comprising an actuator power supply configured to supply power to the vehicle suspension system, and the actuator power supply configured to be electrically connected to the vehicle suspension system via an isolation switch, the method comprising:

receiving a shutdown indicator indicating that the vehicle is in a shutdown state:

outputting an open isolation switch signal, the open isolation switch signal configured to cause the isolation switch to open;

receiving an open isolation switch confirmation signal indicative of the isolation switch being open;

determining whether an open isolation switch confirmation signal is received within a predetermined time period; and outputting a test pass or test failure in dependence upon receipt of the open isolation switch confirmation signal.

15. A non-transitory computer readable medium comprising computer readable instructions arranged to, when executed by a processor, perform a method according to claim 14.

* * * * *